(12) United States Patent
Diamant et al.

(10) Patent No.: US 10,168,909 B1
(45) Date of Patent: Jan. 1, 2019

(54) COMPRESSION HARDWARE ACCELERATION

(71) Applicant: Amazon Technologies, Inc., Seattle, WA (US)

(72) Inventors: Ron Diamant, Albany, CA (US); Svetlana Kantorovych, Haifa (IL); Georgy Machulsky, San Jose, CA (US); Ori Weber, Tel-Aviv (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 15/084,013

(22) Filed: Mar. 29, 2016

(51) Int. Cl.
*G06F 11/34* (2006.01)
*G06F 3/06* (2006.01)

(52) U.S. Cl.
CPC .......... *G06F 3/0605* (2013.01); *G06F 3/0608* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 5,371,499 A * | 12/1994 | Graybill | ................ | G06T 9/005 341/106 |
| 5,850,565 A * | 12/1998 | Wightman | .......... | H03M 7/3084 710/1 |
| 6,145,069 A * | 11/2000 | Dye | ................ | H03M 7/30 345/501 |
| 9,043,555 B1 * | 5/2015 | Khona | ................ | G06F 3/0683 711/118 |
| 9,684,593 B1 * | 6/2017 | Chen | ................ | G06F 12/128 |
| 2009/0013129 A1 * | 1/2009 | Bondurant | .......... | G06F 3/0608 711/115 |
| 2012/0144146 A1 * | 6/2012 | Borkenhagen | ........ | G06F 3/0608 711/170 |
| 2013/0275381 A1 * | 10/2013 | De Schrijvr | ........ | G06F 11/1076 707/652 |
| 2014/0204105 A1 * | 7/2014 | Fang | .................... | H04N 9/8042 345/531 |
| 2015/0085876 A1 * | 3/2015 | Chhatriwala | .......... | H04L 69/04 370/465 |
| 2015/0091902 A1 * | 4/2015 | Pediredla | ................ | G06T 15/80 345/426 |

(Continued)

*Primary Examiner* — Ryan Bertram
*Assistant Examiner* — Trang K Ta
(74) *Attorney, Agent, or Firm* — Kilpatrick Townsend & Stockton LLP

(57) ABSTRACT

Described herein are techniques for providing data compression and decompression within the bounds of hardware constraints. In some embodiments, the disclosure provides that a processing entity may load a portion of a data stream into a memory buffer. In some embodiments, the size of the portion of data loaded into the memory buffer may be determined based on a capacity of the memory buffer. The processing entity may determine whether the portion of data loaded into the memory buffer includes matching data segments. Upon determining that the portion of data does not include matching data segments, the processing entity may generate a sequence that includes uncompressed data and an indication that the sequence contains no matching data segments.

20 Claims, 10 Drawing Sheets

(56) References Cited

U.S. PATENT DOCUMENTS

| | | | |
|---|---|---|---|
| 2015/0316605 A1* | 11/2015 | Deutsch | G01R 31/318547 |
| | | | 702/117 |
| 2016/0371190 A1* | 12/2016 | Romanovskiy | G06F 3/067 |
| 2016/0378352 A1* | 12/2016 | Khan | G06F 3/0608 |
| | | | 711/103 |

* cited by examiner

COMPRESSION HARDWARE ACCELERATION

BACKGROUND

As demand for storage space and networking bandwidth continues to increase, consumers are looking for ways to better utilize the resources available to them. To that end, there is an increasing demand for efficient implementation of data compression techniques. Data compression techniques are techniques directed at manipulation of data to reduce the total number of bytes required to represent the data. Through the use of one or more data compression techniques, current storage space and networking bandwidth may be more efficiently utilized.

There are two types of data compression: lossy and lossless. Lossy data compression allows for some loss of fidelity in the compressed information, while lossless data compression requires that the decompressed data be an exact copy of the original data. While lossy data compression may be suitable for applications that process audio, image and/or video data, a great many other data processing applications (e.g., those with text or computer executable code) require that the decompressed data exactly match the original data, as provided by lossless data compression. Some data in a data stream may be uncompressible by a particular compression algorithm. Uncompressible data may be present in a data stream for a number of reasons. For example, the data may be encrypted, or it may not contain any matching data segments of sufficient length.

BRIEF DESCRIPTION OF THE DRAWINGS

Various embodiments in accordance with the present disclosure will be described with reference to the drawings, in which.

DETAILED DESCRIPTION

Figure 1B:
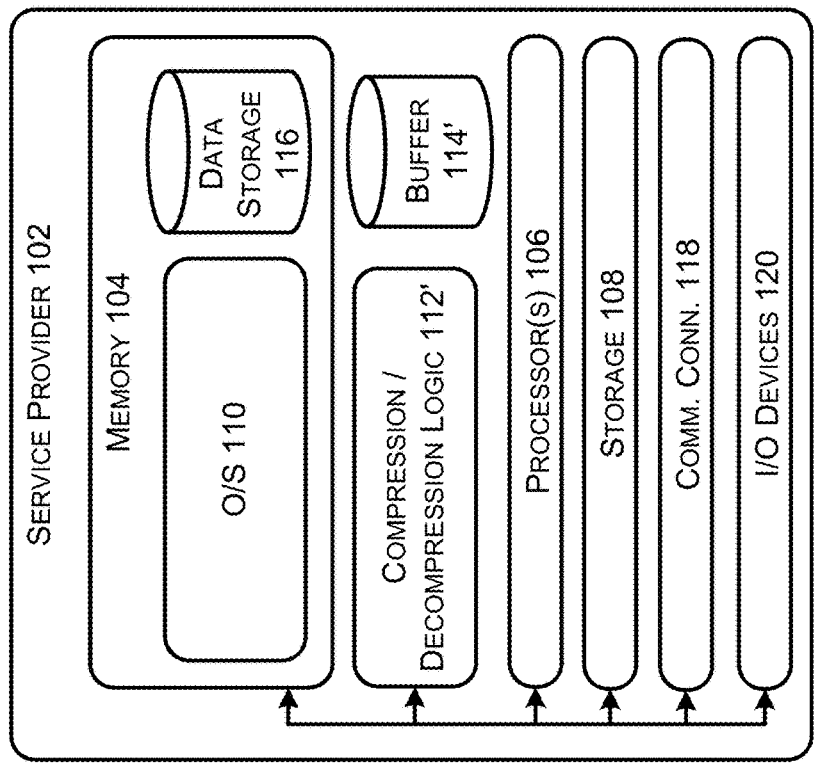
FIG. 1B depicts a service provider computing device configured to implement at least one data compression technique using a hardware based implementation in accordance with the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Implementation of certain embodiments of the disclosure may provide for a number of technical advantages. For example, implementation of the disclosed data compression algorithm may result in a lossless data compression system capable of performing at much higher speeds than those of prior data compression systems. In some embodiments, the data compression algorithm may be implemented via an integrated circuit. By integrating the data compression algorithm on a hardware device, data may be compressed and/or decompressed several times faster than it could be using the same data compression algorithm implemented as only software. Furthermore, by implementing the data compression algorithm on a dedicated hardware device, the data compression may be performed without using processing power of the rest of the system.

Many existing lossless data compression techniques are designed to be implemented as software implementations. Accordingly, the compression techniques often do not account for physical constraints of hardware devices or resource limited systems in general. For example, some of these compression techniques, such as LZ4 lossless data compression, may require that a data stream of an undetermined size be stored in memory while it is being processed. These techniques are difficult to implement in resource-limited systems, as a memory storage device may not have capacity for the entire block of data. Additionally, because a software implementation assumes that an entire block of uncompressible data may be stored in a single sequence, it also assumes that all uncompressible sequences will be followed by compressed sequences. For the above reasons, compression techniques should be adapted for efficient implementation in resource-limited systems (such as hardware implementations).

Described herein is an apparatus configured to provide data compression techniques within the bounds of various hardware constraints. In some embodiments, the data compression techniques may be executed by a processing entity on a data stream. A processing entity may be any integrated circuit or computing device capable of performing the described functions. In some embodiments, the processing entity may utilize electronic components to carry out the described functions. In some embodiments, the processing entity may also utilize computer executable instructions to carry out the described functions. A data stream may be any sequence of data, including a stream of consecutive bits. The stream of bits may make up a set of computer executable instructions, a document, a data value, or any other suitable data. In some embodiments, the processing entity may be communicatively coupled to one or more memory storage devices. In some embodiments, the processing entity may be configured to automatically compress data being written to one or more memory storage device. In some embodiments, the processing entity may be configured to automatically decompress data retrieved from one or more data storage devices. In some embodiments, the processing entity may be a network card or other data transmission means. For example, the processing entity may be configured to compress or decompress a data stream being received by, or transmitted from, a computing entity. In some embodiments, this may be done automatically by the processing entity as it receives transmission data.

By way of illustrative example, a data compression technique may be performed on a data stream by a processing entity. The processing entity may load a portion of the data stream into a memory buffer, wherein the size of the portion of data may be limited by a capacity of the memory buffer. Upon loading the portion of data into the memory buffer, the processing entity may identify matching data segments within the portion of data. In some embodiments, the processing entity may generate a sequence that contains at least some uncompressed data (one or more literal values) as well as a matching data value, or a reference. In some embodiments, a generated sequence may include only uncompressed data and an indication that the sequence contains no matching data.

Upon receiving a request for decompression of a piece of data, the processing entity may load a first sequence into a buffer. The processing entity may determine whether the sequence includes a matching data segment. If the sequence does contain a matching data segment, then the processing entity may append the included uncompressed data to the decompressed data stream followed by the matching data. If the sequence does not contain matching data, then the processing entity may append the uncompressed data in the sequence to the decompressed data stream. The processing entity may process each of the sequences related to requested data in this manner.

FIG. 1 depicts a service provider computing device configured to implement at least one data compression technique in accordance with the disclosure. A service provider 102 may include any system associated with an entity that provides a resource or service. In some embodiments, the service provider may handle functionality of a computer application associated with the entity that provides the resource or service. In the current disclosure, a service provider 102 may include a computing system in which the disclosed techniques are implemented. The service provider 102 may include one or more special-purpose hardware devices for implementing the described techniques. In some embodiments, the service provider may comprise an integrated circuit such as an application-specific integrated circuit (ASIC), field-programmable gate array (FPGA), microcontroller, microprocessor, graphics processing unit (GPU), or system on chip (SoC). In some embodiments, the service provider 102 may comprise a computer readable medium communicatively coupled with one or more processors 106 configured to execute computer executable instructions stored on the computer readable medium. For example, the computer readable medium may include an embedded software capable of being executed by the one or more processors.

The service provider 102 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 102 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 102 may include at least one memory 104 and one or more processing units (or processor(s)) 106. The processor(s) 106 may be implemented as appropriate in hardware, computer-executable instructions, firmware or combinations thereof. Computer-executable instruction or firmware implementations of the processor(s) 106 may include computer-executable or machine executable instructions written in any suitable programming language to perform the various functions described.

The memory 104 may store program instructions that are loadable and executable on the processor(s) 106, as well as data generated during the execution of these programs. Depending on the configuration and type of service provider 102, the memory 104 may be volatile (such as random access memory (RAM)) and/or non-volatile (such as read-only memory (ROM), flash memory, etc.). The service provider 102 may also include additional storage 108, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 104 may include multiple different types of memory, such as static random access memory (SRAM), dynamic random access memory (DRAM) or ROM. Turning to the contents of the memory 104 in more detail, the memory 104 may include an operating system 110 and one or more application programs, circuits, or services for implementing the features disclosed herein including at least logic for compressing and decompressing data (compression/decompression logic 112). The memory 104 may also include a memory buffer 114 which provides temporary storage for processing of data, and a data storage 116, which stores compressed (and uncompressible) sequences. In some embodiments, the data storage 116 may be stored in a database. In some embodiments, the compression/decompression logic 112 and/or the processor(s) 106 may comprise a processing entity. This processing entity is described in greater detail below, with respect to FIG. 2.

Figure 1A:
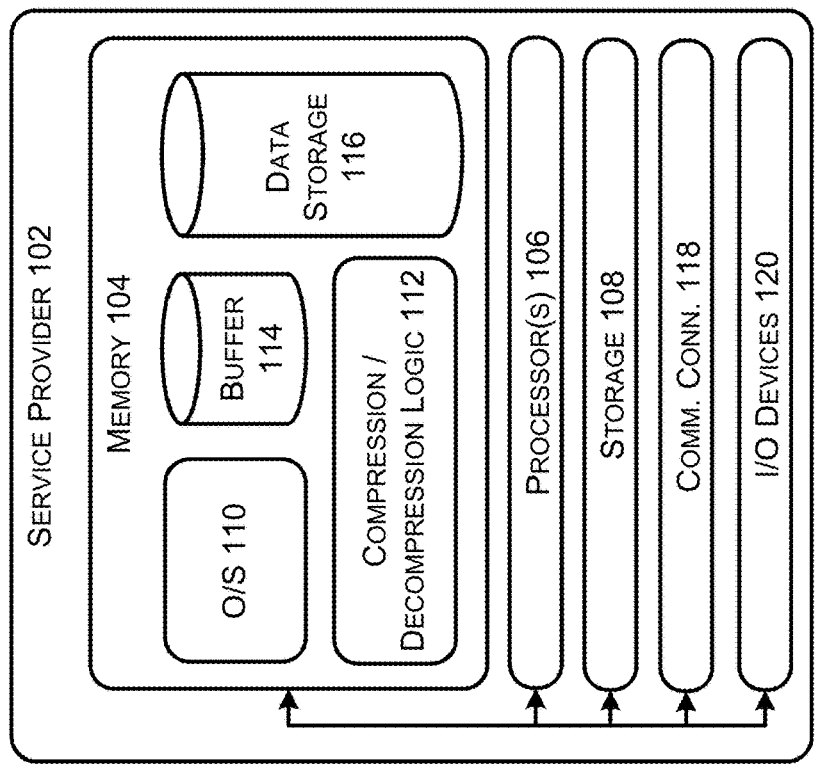
FIG. 1A depicts a service provider computing device configured to implement at least one data compression technique using a software based implementation in accordance with the disclosure.

FIGS. 1A and 1B are directed to two non-limiting examples of a service provider computing device configured to implement at least one data compression technique in accordance with this disclosure. In particular, FIG. 1A depicts a service provider computing device configured to implement at least one data compression technique using a software based implementation and FIG. 1B depicts a service provider computing device configured to implement at least one data compression technique using a hardware based implementation. For the purposes of this disclosure, a reference to compression/decompression logic 112 and/or buffer 114 of FIG. 1A can be substituted with compression/ decompression logic 112' and/or buffer 114' of FIG. 1B (respectively), unless stated otherwise.

The memory 104 and the additional storage 108, both removable and non-removable, are examples of computer-readable and non-removable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the service provider 102.

The service provider 102 may also contain communications connection(s) 118 that allow the service provider 102 to communicate with a stored database, another computing device or server, user terminals, and/or other devices over a network connection. The service provider 102 may also include input/output (I/O) device(s) and/or ports 120, such as for enabling connection with a keyboard, a mouse, a pen, a voice input device, a touch input device, a display, speakers, a printer, etc. In some embodiments, the I/O device 120 and/or the communication connections 118 may comprise a network card or a smart network card. In some embodiments, the compression/decompression logic 112 may operate on a network card. For example, the compression/decompression logic 118 may be implemented as processing logic on the network card itself. In this way, the compression/decompression logic 118 may act to compress or decompress a data stream being received by, or transmitted from, the service provider 102. This may be done automatically (e.g., without any instruction from the service provider 102).

Turning to the contents of the memory 104 in more detail, the memory 104 may include an operating system 110, a database containing data storage 116. In some embodiments, as depicted in FIG. 1A, the memory 104 may also include one or more application programs or services for implementing the features disclosed herein, including a compression/decompression logic 112 and/or a buffer 114. In some embodiments, as depicted in FIG. 1B, the compression/decompression logic 112 and/or buffer 114 may be located outside of the memory 104 (e.g., on a circuit separate from the memory 104).

In some embodiments, the compression/decompression logic 112 may be configured to receive a data stream and apply one or more compression or decompression techniques to the data in the data stream. In some embodiments, the compression/decompression logic 112 may be implemented as a combination of hardware and software. For example, in some embodiments, the compression/decompression logic 112 may comprise a circuit configured to perform the described functions. In some embodiments, the compression/decompression logic 112 may comprise a software application or module installed on a memory device, that when executed, causes a communicatively coupled circuit to perform the described functions. As stated above, the compression/decompression logic 112 may be configured to execute one or more compression or decompression techniques on a data stream. For example, the compression/decompression logic 112 may be configured to input at least a portion of the data stream into the memory buffer 114 to be processed. When performing a compression function, the compression/decompression logic 112 may be configured to identify pairs of matching data within the memory buffer 114 and store indications of the matching data. When performing a decompression function, the compression/decompression logic 112 may be configured to construct a decompressed version of the portion of the data stream using indications of matching data. These functions are described in greater detail with respect to FIG. 2 below.

The memory buffer 114 may comprise any suitable volatile or non-volatile memory. In some embodiments, the memory buffer 114 may comprise a random access memory (RAM). For example, the memory buffer 114 may comprise a static random access memory (SRAM) or dynamic random access memory (DRAM). In some embodiments, the memory buffer 114 may comprise an on-chip memory, such as scratchpad memory. It should be noted that memory buffer 114 may comprise zero-capacitor random access memory (Z-RAM®), TTRAM, advanced random access memory (A-RAM), ETA RAM, registers, or any other memory suited for temporary data storage. The memory buffer 114 may be configured to store data from a data stream while that data is being processed by the compression/decompression logic 112. Once completed, the processed data may be written to the data storage 116.

Data storage 116 may comprise any suitable volatile or non-volatile memory. In some embodiments, the data storage 116 may comprise a read-only memory (ROM), a flash memory, a hard disk drive, an optical disc, or any other memory suited for long-term data storage. In some embodiments, the compression/decompression logic 112 may store sequences of compressed and/or uncompressible data to the data storage 116 upon completion of a compression function. In some embodiments, the compression/decompression logic 112 may retrieve sequences (or other portions of data) from the data storage 116 in order to perform a decompression function on the retrieved sequence.

In accordance with at least some embodiments, the service provider 102 may be a network interface controller (i.e., a network card). The network interface controller may be configured to process data traveling between a computing device and a network. In some embodiments, all data being provided by the computing device to the network may be compressed automatically using the compression/decompression logic 112. In some embodiments, all data being provided by the network to the computing device may be decompressed automatically using the compression/decompression logic 112. In some embodiments, the network card may have limited processing power, more stringent power requirements than a general purpose processor, and/or may need to make real time streaming decisions without having the context that a general purpose processor might have. For example, the network card may not know ahead of time whether data received by the network card to be processed is encrypted (and hence not compressible). Furthermore, the network card may not be capable of determining the size of an uncompressible portion of a data stream. In such a network card, it may be necessary to implement data compression algorithms that are cognizant of the hardware limitations.

FIG. 2 depicts an example process data flow that may be implemented in accordance with at least some embodiments. In FIG. 2, a processing entity 202 may receive an instruction to compress data of an uncompressed data string 204. Processing entity 202 may comprise an integrated circuit such as an application-specific integrated circuit (ASIC), field-programmable gate array (FPGA), microcontroller, microprocessor, graphics processing unit (GPU), or system on chip (SoC).

Upon receiving instructions to compress data of the uncompressed data string 204, the processing entity 202 may load at least a portion of data of the uncompressed data string 204 into buffer 206 to be processed. The size of the portion of data loaded may be determined by a capacity of the buffer 206. In accordance with at least some embodiments, the buffer 206 may be an example buffer 114 of FIG. 1.

Figure 2A:
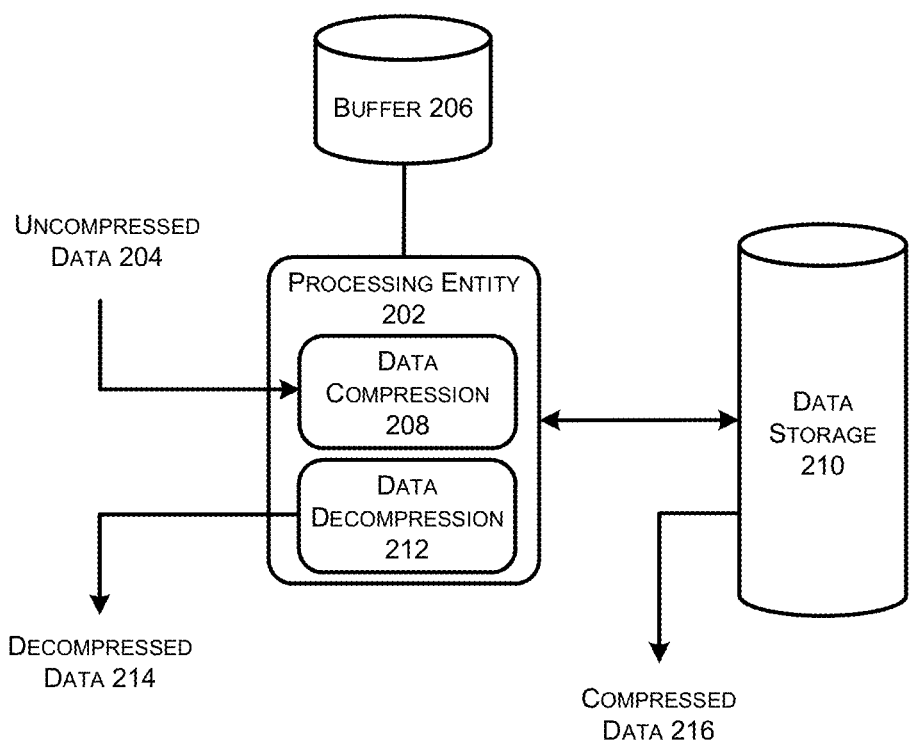
FIG. 2A depicts an example process data flow that may be implemented with an external buffer in accordance with at least some embodiments.
Figure 2B:
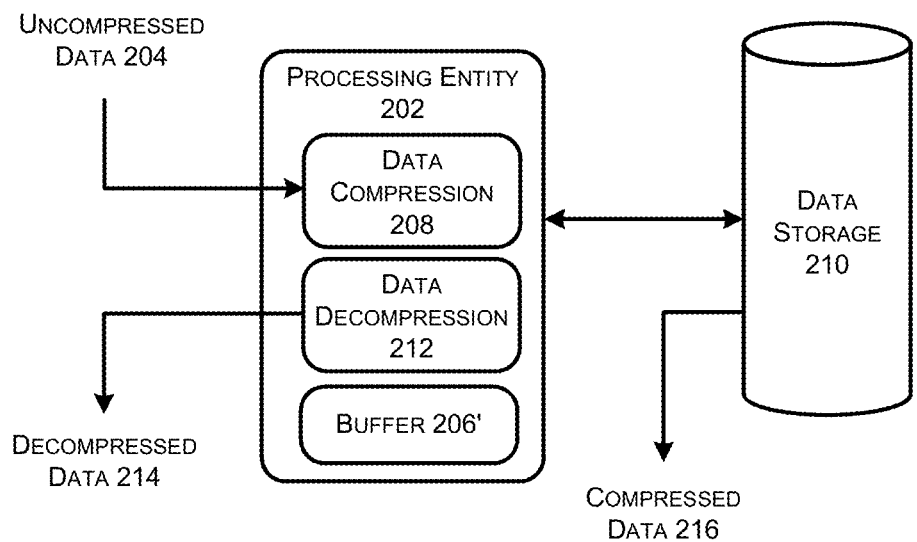
FIG. 2B depicts an example process data flow that may be implemented with an internal buffer in accordance with at least some embodiments.

FIG. 2A and FIG. 2B each illustrate different example embodiments of a communicative relationship between a processing entity 202 and a memory buffer 206 or 206'. As described above, the buffer 206 may be any data storage suited for temporary data storage. In FIG. 2A, a buffer 206 may be communicatively coupled to the processing entity 202. In FIG. 2B, a buffer 206' may be located on the processing entity itself. For example, buffer 206' may comprise an on-chip memory. Using an on-chip memory such as buffer 206' enables the processing entity 202 to process data at a much higher speed than if the buffer were located outside of the processing entity. For the purposes of this disclosure, a reference to buffer 206 of FIG. 2A can be substituted with buffer 206' of FIG. 2B, unless stated otherwise.

Upon loading the portion of data into the buffer 206, the processing entity 202 may perform a data compression function 208 on the loaded portion of data. Once the data compression function 208 has been completed, the compressed data may be stored at data storage 210. In some embodiments, data storage 210 may be an example of data storage 116 of FIG. 1. In accordance with at least some embodiments, a data compression function 208 may compress data in the buffer 206 by generating sequences from that data. To do this, the processing entity may search for at least one data segment within the buffer 206 that exactly matches another data segment within the buffer 206. For example, the compression algorithm may replace repeated occurrences of data in an uncompressed data stream 204 with references to a single copy of that data existing earlier in the uncompressed data stream 204. This may result in the generation of a sequence, or a block of compressed data (though it should be noted that the sequence may contain uncompressible data or literals). Some embodiments of the data compression algorithm may utilize a search pointer or cursor that moves through the buffer 206 data. In order to spot matches, the data compression function may keep track of some amount of the most recent data that the search pointer has passed, such as the last 2 kB, 4 kB, or 32 kB. Some embodiments of the data compression algorithm may utilize a dictionary. For example, the data compression function may operate by searching for matches between the text to be compressed and a set of strings contained in a data structure (called the 'dictionary') maintained by the data compression function. It should be noted that any suitable data compression technique may be utilized by the data compression function 208.

In accordance with at least some embodiments, a data compression function 208 may treat a portion of the data stream stored in the buffer 206 as a separate data stream to be compressed. For example, a portion of the data from the uncompressed data stream 204 may be loaded into the buffer 206. This portion of data may then be compressed by the data compression function 208 independent from any other compression performed with respect to the rest of the data in the uncompressed data stream 204. Additionally, where no matches may be found in the portion of the data stream loaded into the buffer, the data compression function 208 may generate a sequence having no matching data.

In accordance with at least some embodiments, the processing entity 202 may receive instructions to decompress one or more pieces of data stored in data storage 210. In this example, the processing entity may receive a request for an uncompressed version of a particular piece of data. The processing entity may determine a location at which the data is stored via one or more attributes of the data storage 210 (e.g., using an index) and load one or more sequences into the buffer 206. To generate a decompressed version of the data 214 in one illustrated embodiment, the data decompression function 212 may append a literal string from the sequence to the decompressed data 214 followed by any matching data of the sequence (as indicated by an offset value and match length value). This may be repeated for each of the sequences in order until all of the sequences have been decompressed.

A sequence to be decompressed may include an indication that the sequence contains no matching data. For example, in some embodiments, the sequence may have an offset value set to zero. In some embodiments, the literal length value may be equal to a predetermined value (e.g., a maximum literal length based on the capacity of the buffer 206). In some embodiments, a match length value (e.g., within the token) that is set to zero may be used to indicate that there is no matching data. In current implementations, a match length of zero is used to indicate a match of length four present in the sequence. Accordingly, embodiments which utilize a match length of zero to indicate that there is no matching data may require an alteration to one or more legacy data compression systems to be compatible. The indication that the sequence contains no matching data may take any suitable form. Upon detecting the indication that the sequence contains no matching data, the data decompression function 212 may append the literal to the decompressed data stream 214 and load the next sequence into the buffer 206. The decompressed data 214 may be provided to a requesting entity, such as an application or module.

In accordance with at least some embodiments, compressed data 216 stored in data storage 210 may be transmitted to a second computing device. For example, compressed data 216 may be retrieved from data storage 210 and routed over a network connection to a second computing device capable of decompressing the compressed data 216. The compressed data 216 may then be stored at the second computing device or decompressed. In this way, an amount of network bandwidth needed to transmit data may be reduced according to at least some implementations of the disclosure.

Figure 3A:
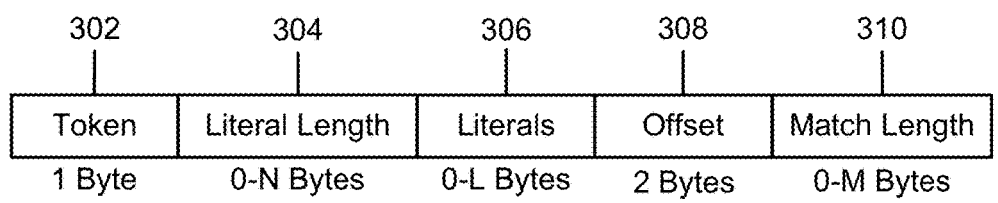
FIG. 3A depicts a sequence structure used in accordance with a software implementation of the LZ4 lossless data compression algorithm.
Figure 3B:
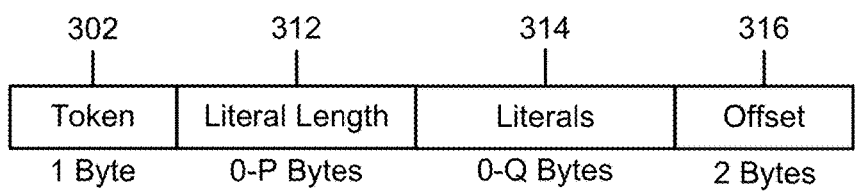
FIG. 3B depicts an example sequence structure that may be implemented when a literal length is greater than a physical memory capacity in accordance with at least some embodiments.

FIGS. 3A and 3B depict an illustrative example of a sequence structure that may be utilized in accordance with at least some embodiments. A sequence is a block of compressed and/or uncompressible data stored by a data compression algorithm. For purposes of illustration only, the disclosure makes reference to the LZ4 lossless data compression algorithm. The LZ4 lossless data compression algorithm is an LZ77 based compression scheme, in which data compression is achieved by replacing repeated occurrences of data with references to a single copy of that data existing earlier in the uncompressed data stream. However, it would be understood by one skilled in the art that the illustrated techniques may be implemented using other suitable data compression algorithms.

FIG. 3A depicts a sequence structure used in accordance with a software implementation of the LZ4 lossless data compression algorithm. The sequence depicted is an existing data structure that may be created using the described algorithm to compress data within a data stream.

The LZ4 data compression algorithm represents processed data as a series of sequences. Each sequence produced by the LZ4 data compression algorithm begins with a one byte token 302 broken into two 4-bit fields. The first field represents the number of literal symbols that are to be copied to the output. The second field represents the number of symbols that match data in the already decoded output (with 0 representing the minimum match length of 4 bytes). A value of 15 in either of the 4-bit fields indicates that the length may need to be represented by an additional field. In this scenario, at least one extra byte of data may be used to represent the corresponding length. A value of 255 in this extra bytes indicates that yet another byte is required to represent the corresponding length. In this way, a length of a literal data segment and/or a length of a matching data segment are represented by a series of extra bytes containing the value 255 followed by a byte containing a value less than 255 (0-255). Additional bytes representing a literal length 304 may immediately follow the token.

A string of literals (uncompressible data) 306 follows the token 302 or the literal length 304 (depending on whether the sequence contains an additional literal length 304 field). The string of literals 306 contains a continuous stream of data that is not compressible using the LZ4 data compression algorithm. The string of literals 306 may be a length represented by any non-negative value L. The data value in the literal length 304 field represents the length of the string of literals 306. The literal length 304 may be any number of symbols N required to represent the value L.

Current implementations of the LZ4 lossless algorithm utilize a sequence structure that includes an offset 308 field as well as an additional match length 310 field. The offset field represents a position at which a match for the reference data can be found (e.g., the number of spaces from a cursor's current position from which to copy data). The match length 310, as described above, represents a number of symbols that may be matched to the data found at the offset 308. As described above, a match length 310 field may only be included in the sequence if the length of a match is greater than 19 symbols (15 from the 4-bit field plus the minimum match length of 4 bytes). The match length 310 may be any number of symbols M required to represent the number of symbols of matching data. The value M may be any non-negative value.

It should be noted that the sequence, as described, includes both a literal (uncompressible segment) and a match segment. The sequence depicted in FIG. 3A is unable to account for segments of data that are completely uncompressible (match length must be at least 4). Additionally, the offset value is not allowed to be 0 (as it would indicate that a match exists at the current position).

By way of illustrative example, consider a scenario in which the data stream (illustrated as a text string) "ABCDEF1234567890ABCDEF123BABA0987654321" is to be compressed. In this example, the data compression algorithm would recognize a literal value (an uncompressible portion of the data stream) as "ABCDEF1234567890," which is of length 16. Additionally, the data compression algorithm would recognize a match value as "ABCDEF123," with a length of 9. Accordingly, the compression algorithm would generate a sequence as follows. First, a token may be generated as F5 (wherein F represents a literal length with a value of 15 and wherein 5 represents a match length of nine (5 plus the minimum match length of 4)). Next, because the literal length is equal to 15 (F), an additional byte may be appended to the token to represent an additional literal length. In this case, the remaining literal length is 1. The literal value ABCDEF1234567890 is appended to the token and additional literal length. The data compression algorithm may then generate a reference to a portion of the literal value (in the current sequence or in a previous sequence) that matches the match value. The reference may include an offset value and an additional match length field. In the current example, the offset is 16 (10 in hexadecimal) as the match data is identical to a portion of the text string starting 16 positions before the position of the match data. Because the match length (9) is not greater than 19, there is no need to append an additional match length value to the sequence in this example. The resulting sequence for this illustrated example would be F5 (token) 1 (literal length) ABCDEF1234567890 (literal) 10 (offset) and no match length value, or "F51ABCDEF123456789010."

FIG. 3B depicts an example sequence structure that may be implemented when a literal length is greater than a physical memory capacity in accordance with at least some embodiments. It should be noted that the sequence depicted in FIG. 3A may be implemented on the condition that a literal length is less than a physical memory capacity (e.g., when a match is identified).

As depicted, the sequence structure may also include a token 302. Similar to the token 302 described with respect to FIG. 3A, the token 302 of FIG. 3B may include a first field representing a number of literal symbols that are to be copied to the output and a second field representing a number of symbols that match data in the already decoded output (though this field may be ignored). The sequence may also include a literal length 312 and a string of literals 314. In some embodiments, the sequence may also include an offset 316.

Because the length of the string of literals is bound by a physical memory capacity in this embodiment, it should be noted that the literal length 312 depicted may be subject to a maximum value. Unlike the unbounded string of literals 306, the string of literals 314 is limited in length to be equal to or less than a maximum value Q determined by the capacity of the memory. Likewise, the length of the literal length field 312 must be bounded by P (where P is the maximum number of symbols needed to represent Q). In some embodiments, a compression algorithm modeled after the LZ4 decompression algorithm may, upon determining that a value in the literal length field 312 is equal to Q, determine that the sequence contains no matching data.

In some embodiments, a match length field (the four low bits of the token) may be used to indicate that there is no matching data in a sequence. In typical data compression algorithms, a match length value of 0 is used to indicate that a match of length four exists within a generated sequence. However, in some embodiments of the current disclosure, the data compression logic may be configured to determine, upon identifying a match length value of zero, that there is no matching data. Under this configuration, a match length value of 1 may be used to indicate a minimum match length of 4. In some cases, because of the change in meaning of a match length being set equal to zero, this configuration may not be compatible with legacy data compression systems.

In some embodiments, the sequence may include an offset field 316. In the event that the sequence does include an offset field, but no matching data, the value occupying the offset field may be set to zero. Because zero is typically an illegal value for the offset field 316, a value of zero may be used to indicate to the processing entity that the sequence contains no matching data when the sequence is to be decompressed.

By way of illustrative example, consider the scenario described with respect to FIG. 3A in which the data stream "ABCDEF1234567890ABCDEF123BABA0987654321" is to be compressed. However, consider also that a memory capacity exists such that only 10 bytes may be loaded into the buffer to be processed at a time. In this example, the data compression algorithm would recognize a literal value (an uncompressible portion of the data stream) as "ABCDEF1234," which is of length 10. Additionally, the data compression algorithm would recognize no matching values within this data. Accordingly, the compression algorithm would generate a sequence as follows. First, a token may be generated as A0 (wherein A represents a literal length with a value of 10 and wherein 0 represents a match length of zero or 4 (the minimum match length)). Next, because the literal length is equal to 10 (A), no additional bytes may be appended to the token to represent additional literal length. The literal value ABCDEF1234 is then appended to the token. Because there is no matching data in the text string loaded into the buffer, no reference needs to be generated in this example. To illustrate that there is no matching data in this sequence, an offset value may be set to 0. Because there is no matching data, there is no need to append an additional match length value to the sequence in this example. The resulting sequence for this illustrated example would be A0 (token) ABCDEF1234 (literal) 0 (offset) 0 (match length), or "A0ABCDEF12345."

In this example scenario, the next 10 bytes of data would be loaded into the buffer and a second sequence would be generated. The second sequence would be directed to the portion of the data stream "567890ABCD" that is loaded into the buffer. For this second text string, the literal value is "567890" of length 6. The match data is "ABCD" of length 4 and is matched to data 16 positions before the current position. Accordingly, the second sequence token would be generated as 60 (6 being the length of the literal and 0 indicating the minimum match length of 4). There is no additional literal length, so no additional literal length field would be added here. The offset would still be 10 (representing 16 positions before the current position, which is within the previous sequence). The resulting sequence would be "6056789010."

Furthermore, it should be noted that embodiments of this disclosure may result in one or more sequences that include no literal data. To illustrate this, consider a continuation of the above example, in which the next portion of the data stream is loaded into the 10 byte buffer (EF123BABA0). In this example, a third sequence may be generated using this portion of the data stream. Here, there is no literal value as the value "EF123" is a match to a literal value in a previous sequence. The generated token would be 01 (0 representing a literal length of zero and 1 representing a match length of five (one plus the minimum match length of four)). The offset here would be 10 (the data is matched to a literal value beginning 16 positions before the current position). There is no additional match length field since the match length of 5 is less than 19. Accordingly, the sequence would be generated as "0110." The remainder of the data stream (BABA0) would then be processed in a subsequent sequence.

Figure 4:
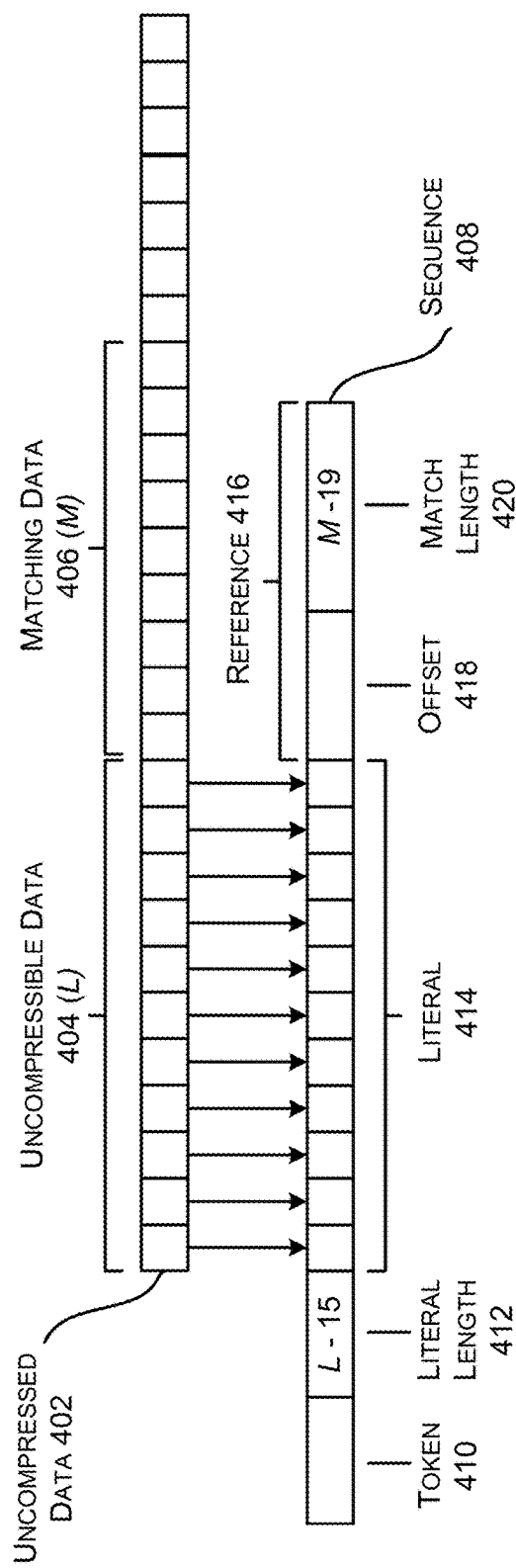
FIG. 4 depicts a current example of a generation of a sequence using one or more data compression algorithms in accordance with at least some embodiments.

FIG. 4 depicts a current example of a generation of a sequence using one or more data compression algorithms in accordance with at least some embodiments. In FIG. 4, a data compression technique may be implemented on a stream of uncompressed data 402. To begin, an uncompressible portion of data 404 from the stream of uncompressed data 402 of length L may be identified. The uncompressible portion of data 404 may be the portion of the uncompressed data stream up to an identified portion of matching data 406 of length M.

In some embodiments, the one or more data compression algorithms may generate a sequence 408 from the uncompressed data stream 402. The sequence 408 may be created by first generating a one byte token 410 with four bits dedicated to the length L and four bits dedicated to the length M. In the scenario that L is greater than 15, the token may be followed by one or more bytes dedicated to an additional literal length 412. The literal length field 412 may be followed by the uncompressible portion of data 404 being appended to the literal length 412 as a literal value 414.

In some embodiments, a reference 416 may be appended to the literal value 414. A reference 416 may comprise an offset value 418 that indicates a number of positions from a current cursor position that the matching data may be matched to and a match length 420 that indicates a length of the matched data.

Figure 5:
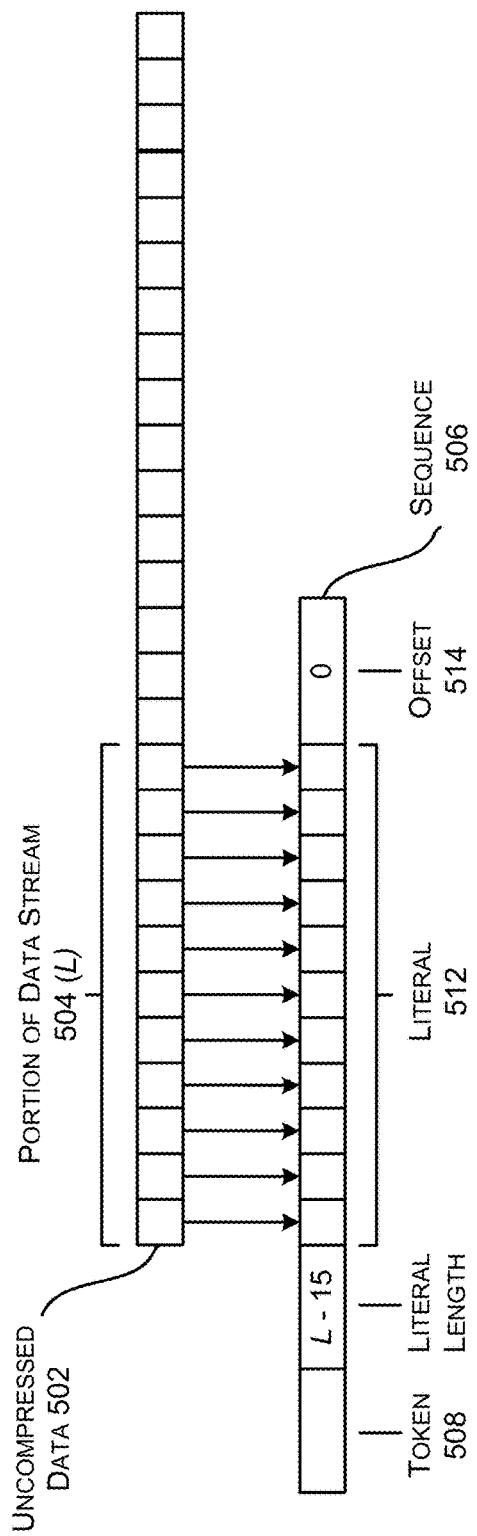
FIG. 5 depicts a process for generating a sequence having no matching data using one or more data compression techniques in accordance with at least some embodiments.

FIG. 5 depicts a process for generating a sequence having no matching data using one or more data compression techniques in accordance with at least some embodiments. In FIG. 5, a data compression technique may be implemented on a stream of uncompressed data 502. To begin, a portion of data from the stream of uncompressed data of length L may be loaded into a buffer. Length L of a portion of the data stream 504 may be bounded by a maximum buffer capacity.

Upon using a data compression algorithm to determine that no matching data is present in the portion of data, a sequence 506 may be generated. To begin the sequence 506, a token 508 may first be created. In some embodiments, a token 508 may be one byte of data, with the first four bits representing either the length L or 15 (whichever is lower). The second four bits may comprise any value if no matching data is found in the portion of the data stream. If the first four bits represent the value 15, then a literal length field 510 may also be generated and appended to the token 508. The literal length field 510 may be populated with a value that represents the length L minus 15 (corresponding to the 15 represented in the token).

Once the sequence 506 has been populated with a token 508, and potentially a literal length field 510, a literal field 512 of length L may be appended to the sequence 506. Where no matching data is present, the literal may represent an exact copy of a portion of the data stream 504 that has been loaded into the buffer. It should be noted that in some embodiments, the length L may be any number of symbols, bounded only by the physical memory capacity of the buffer. It should be noted that as memory buffer technology advances, the length L may increase as buffer capacity is increased.

In accordance with at least some embodiments, an offset field 514 may be added to the sequence 506. Where no matching data is present, the offset field 514 may be populated with a value of zero to reflect the fact that the sequence contains no data matches. When the sequence 506 is decompressed, a decompression algorithm may be configured to stop reading data from the sequence upon detecting a value of zero in the offset field 514, and move on to the next sequence. For example, the sequence 506 is depicted as lacking a match length field. In this scenario, a zero located in the offset field 514 may indicate that it is the end of the sequence 506 and the sequence contains no matching length field.

Figure 6:
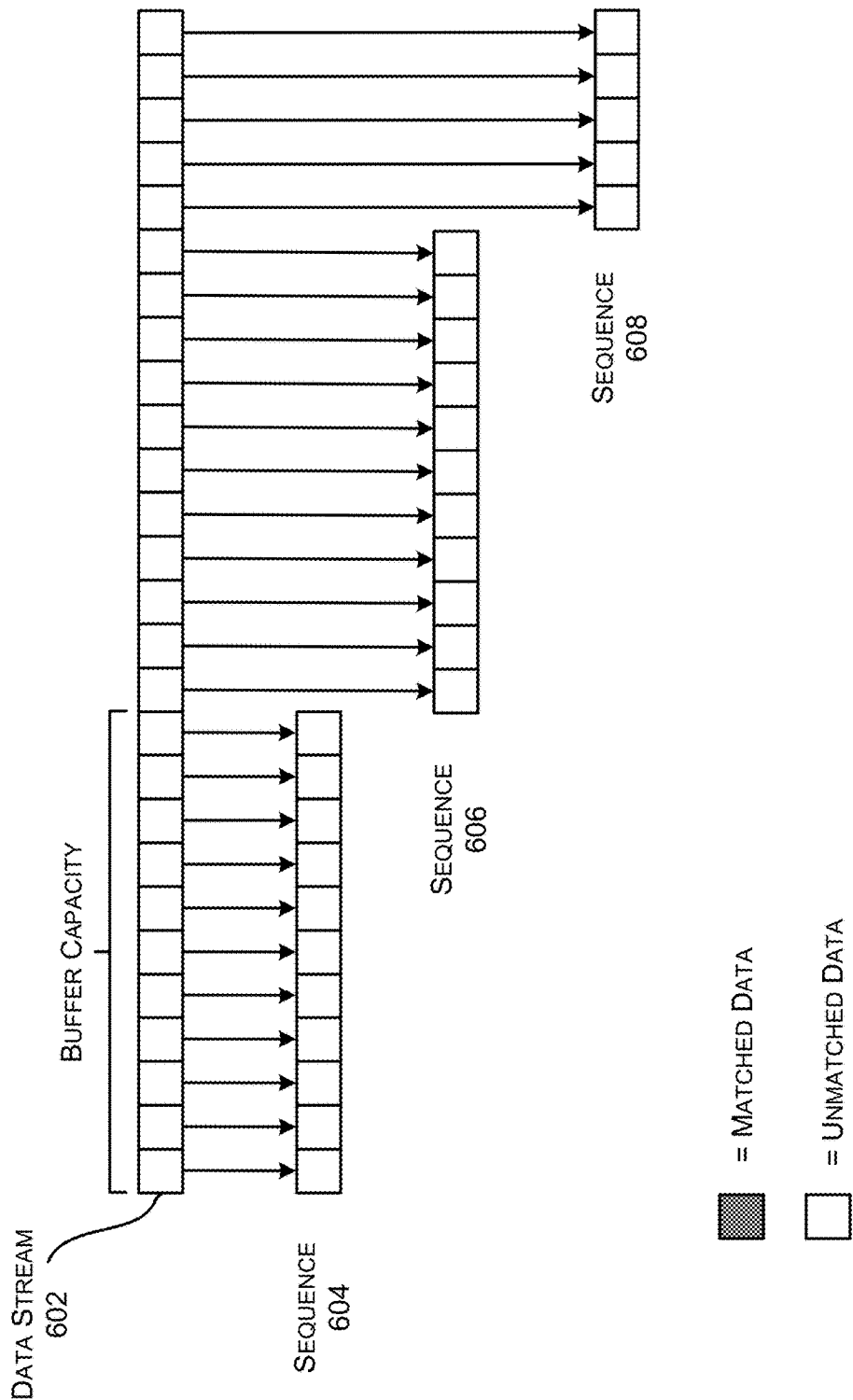
FIG. 6 depicts a process for creating multiple sequences out of uncompressible data of a data stream while limited by a buffer capacity in accordance with at least some embodiments.

FIG. 6 depicts a process for creating multiple sequences out of uncompressible data of a data stream while limited by a buffer capacity in accordance with at least some embodiments. As depicted in FIG. 6, it may be determined that a data stream 602 includes no matching data. In some embodiments, a determination that there is no matching data may mean that there is no matching data within the portion of the data stream that is loaded into the memory buffer (e.g., the portion of data from which the current sequence is being generated).

Upon determining that no matching data is present, a processing entity may systematically load portions of a data stream 602 into the memory buffer. The processing entity may then attempt to identify compressible data (a second data segment that exactly matches a first data segment that may be replaced with a reference to the first data segment). If the processing entity is unable to identify compressible data within the buffer, then the data in the buffer is treated as a literal value and used to generate a sequence. The processing entity may generate multiple sequences (e.g., sequence 604, sequence 606, sequence 608, etc.) from a single data stream 602. Each of the sequences generated using uncompressible data may additionally include an indication that there are no matching data segments within the sequence. In some embodiments, the indication may be represented by a literal length value that is equal to, or greater than, a predetermined value. For example, the memory buffer may be associated with a maximum number of symbols that may be stored within it based on a physical capacity. In this example, a literal length value that is equal to, or greater than, that maximum number may indicate that there are no matching data segments. In some embodiments, the indication may be represented by an offset value of zero. In data compression algorithms that require each sequence to have some matching data, an offset of zero is typically an illegal value as it implies that the data segment is a copy of itself. By removing the requirement that a sequence is required to contain some matching data, an offset of zero may then be utilized to indicate that no matching data is present. In some embodiments, a combination of indications may be used to indicate that a sequence has no matching data segments.

By way of illustration, consider the following scenario in which multiple indications may be used to indicate that there are no matching data segments in a sequence. In this scenario, a processing entity may determine that a literal length value of a first sequence is equal to a predetermined value. The processing entity, in this scenario, may simply append the literal value of the first sequence to a decompressed data stream and load a second sequence into the memory buffer. Upon decompressing the second sequence, the processing entity may first determine that a literal length of the second sequence is less than the predetermined value. This may indicate that there may be a matching data segment. After appending the literal value to the decompressed data stream, the processing entity may read the offset value and determine that the offset value is 0. Upon reading this value, the processing algorithm may determine that no matching data segments are present and may subsequently load the next sequence into the memory buffer to be processed.

There are a number of ways in which a sequence may be created that has no matching data segments, but is of a length less than a predetermined value. For example, in some embodiments the data loaded into the memory buffer may not take up the entire memory buffer. This scenario is illustrated by sequence 608. In another embodiment, multiple sequences may be generated from the same portion of the data stream 602 loaded into the memory buffer. This scenario is illustrated below with respect to sequence 708 of FIG. 7. In these embodiments, it may be necessary to use an offset value of 0 to indicate that no matching data segments exist within the sequence.

Figure 7:
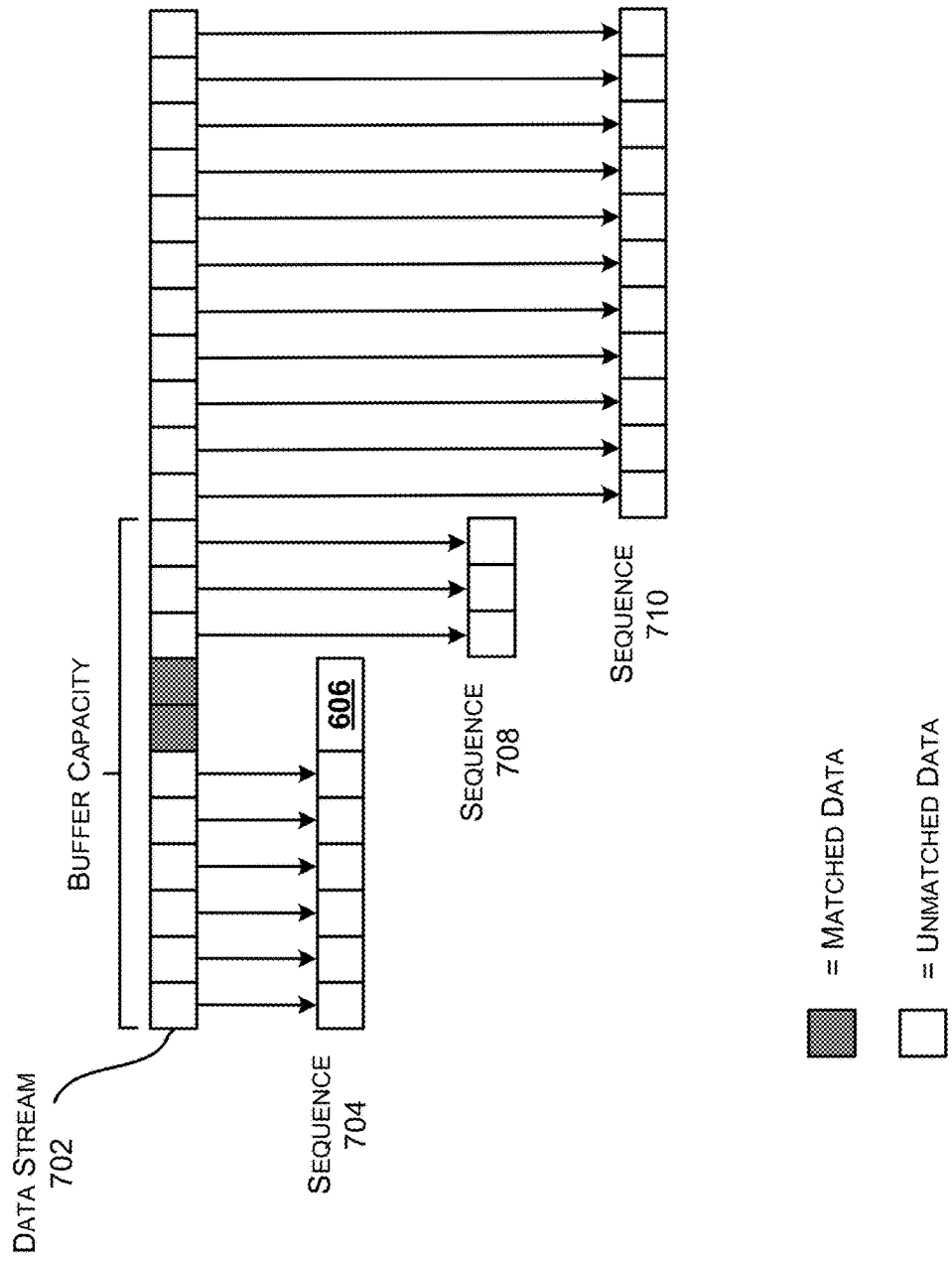
FIG. 7 depicts a process for generating multiple sequences from a data stream with respect to a buffer capacity in accordance with at least some embodiments.

FIG. 7 depicts a process for generating multiple sequences from a data stream with respect to a buffer capacity in accordance with at least some embodiments. In FIG. 7, data stream 702 is depicted as including at least one matched data segment within a portion of the data stream 702 loaded into a memory buffer. To generate sequence 704, the processing entity may append the literal value, up to the matched data, to a token and literal length value. The processing entity may then append a reference 706 to the sequence 704. A reference 706 may be a representation of the matched data. For example, the reference 706 may include an offset value and a match length, indicating where to begin matching data and what length of data is to be matched.

Once the matched data has been processed, the processing entity may begin generating a new sequence from the portion of data remaining in the memory buffer. For example, the processing entity may generate sequence 708 from uncompressible data remaining in a memory buffer after sequence 704 has been generated. Accordingly, the generated sequence 708 may contain a literal value that includes the portion of data from the memory buffer not included in sequence 704. Once sequence 708 has been generated by the processing entity, the memory buffer may be cleared and the processing entity may load the next portion of data from the data stream 702 into the memory buffer and generate the next sequence (e.g., sequence 710).

Figure 8:
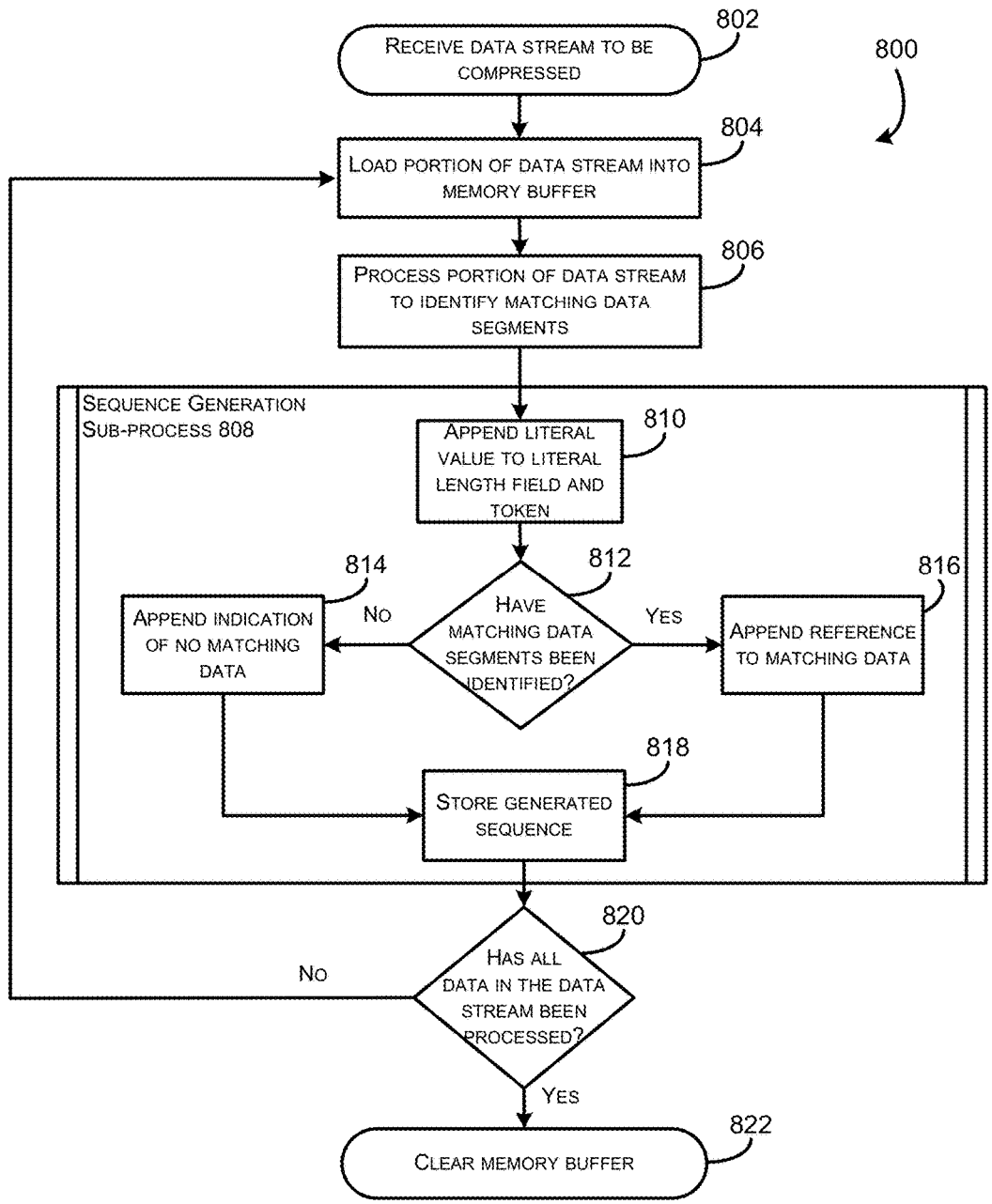
FIG. 8 depicts a process for compressing a data stream into a series of sequences in accordance with at least some embodiments.

FIG. 8 depicts a process for compressing a data stream into a series of sequences in accordance with at least some embodiments. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the processes in 800 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 800 of FIG. 8 may be performed by at least by the service processing entity 202 depicted in FIG. 2. The code may be stored on a computer-readable storage medium, for example, in the form of a computer program including a plurality of instructions executable by one or more processors. The computer-readable storage medium may be non-transitory.

Process 800 may begin at 802, when a processing entity receives a data stream to be compressed. As described above, the processing entity may be communicatively coupled to a memory storage buffer. Upon receiving a data stream to be compressed, the processing entity may load a portion of the data stream into the memory storage buffer at 804. In some embodiments, the portion of the data stream may be limited to an amount of data capable of fitting within a capacity of the memory storage buffer. Once the portion of the data stream has been loaded into the memory storage buffer, the processing entity may determine whether the portion of data contains matching data segments at 806. Whether or not the portion of data includes matching data segments, the processing entity may identify a literal value (an uncompressible sequence of data) and a length of that literal value. If a matching data segment is found, then the literal will comprise the first portion of data up to the second occurrence of the matching data segment. If no matching data segment is found, then the literal will comprise all of the data loaded into the memory buffer.

Upon processing the portion of data to identify matching data segments, the processing entity may initiate sequence generation sub-process 808. Using this sub-process, the processing entity may generate one or more sequences from the data stream. In sub-process 808, the processing entity may generate a sequence by first generating a token that includes a literal length and a match length. In the event that the literal length is greater than 14, a literal length field may be appended to the generated token. The literal length field may be populated with a value representing a length of the identified literal. Once the token (and literal length field) has been generated, the literal value may be appended to it at 810. The processing entity may determine whether matching data segments have been identified in the portion of data at 812. If no matching data segments have been identified, then an indication that there is no matching data segments may be appended to the sequence at 814. If matching data segments have been identified, then a reference may be appended to the sequence at 816. As described earlier in this disclosure, a reference may be a representation of the matched data segment, and may include an offset value and a match length value. A match length value of 19 (to include a minimum match length size of four as well as up to 15 additional bytes) may be represented in the token. If the match length size is greater than 19 bytes, then the reference may also include an additional match length field. Once the sequence has been generated, it may be stored in another data store at 818. For example, the sequence may be stored on a hard drive or other non-volatile memory device.

In process 800, the processing entity may determine if all of the data from the received data stream has been processed after storing the generated sequence at 820. If there is still data in the data stream to be compressed, the process 800 may return to 804 and load the next portion of data into the memory buffer. If all of the data has been processed, the processing entity may clear the memory buffer at 822.

Figure 9:
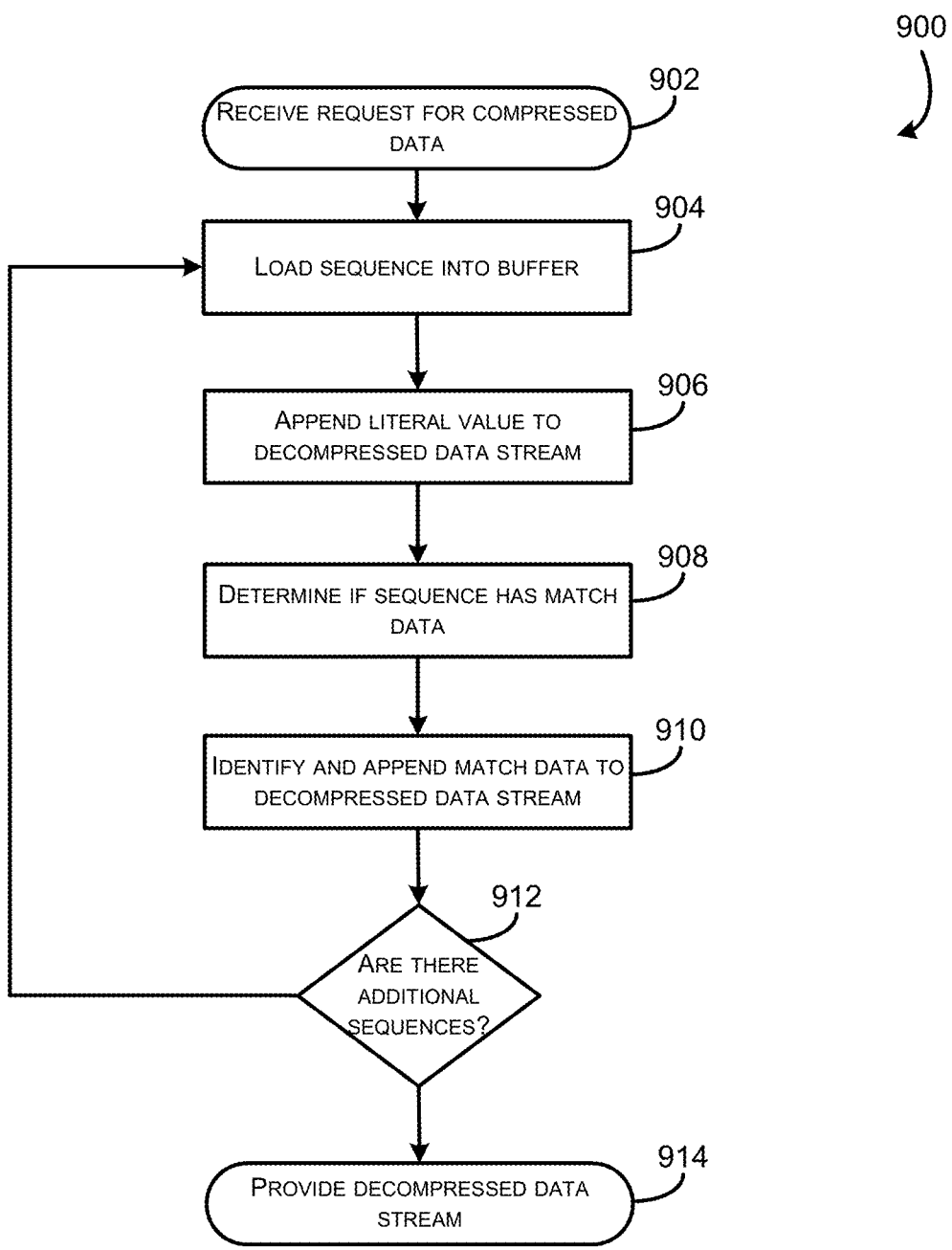
FIG. 9 depicts a process for decompressing a series of sequences into a data stream in accordance with at least some embodiments.

FIG. 9 depicts a process for decompressing a series of sequences into a data stream in accordance with at least some embodiments. Process 900 may begin at 902, when a request is received by a processing entity to provide a data stream. In some embodiments, the data related to the data stream may be stored in a non-volatile memory. The data to be retrieved may be stored as a series of sequences, each having gone through a data compression process. Upon receiving the request for data, the processing entity may identify the sequences related to the request. The processing entity may begin the data decompression process by loading a first sequence into a memory buffer at 904.

When processing the sequence, the processing entity may first determine a length of a literal value included in the sequence. In some embodiments, this may be indicated via a token and/or a literal length field. In some embodiments, the processing entity may be required to add values from two separate fields (e.g., add a value from the token to the literal length field) to determine a total length of a literal value.

Once the length of the literal value has been determined, the processing entity may append the literal value to a decompressed data stream at 906, wherein the decompressed data stream may start out as an empty string. After appending the literal value to the decompressed data stream, the processing entity may determine if the sequence has matching data at 908. In some embodiments, the processing entity may determine that the literal length is equal to a maximum value. In some embodiments, an offset value located after the literal value in the sequence may be used to indicate whether the sequence does or does not have a matching data value. For example, a value of zero in the offset field may indicate that the sequence has no matching data whereas any other value may indicate that it does. If the sequence is determined to have a matching data value, then the processing entity may identify a reference for the matching data. The reference may be used to identify the matching value so that it may be appended to the decompressed data stream at 910. For example, the sequence may contain an offset value and a match length value. In this example, the processing entity may move to the location indicated by the offset value and read data of a length equal to the match length value. This data may then be appended to the decompressed data stream.

Once all of the literal values and match data values from the sequence have been identified and appended to the decompressed data stream, the processing entity may determine whether additional sequences need to be processed at 912. If additional sequences need to be processed, then the process 900 may return to 904 and load the next sequence into the memory buffer to be processed. If no additional sequences are required to be processed, the processing entity may provide the decompressed data stream to the requestor at 914.

Figure 10:
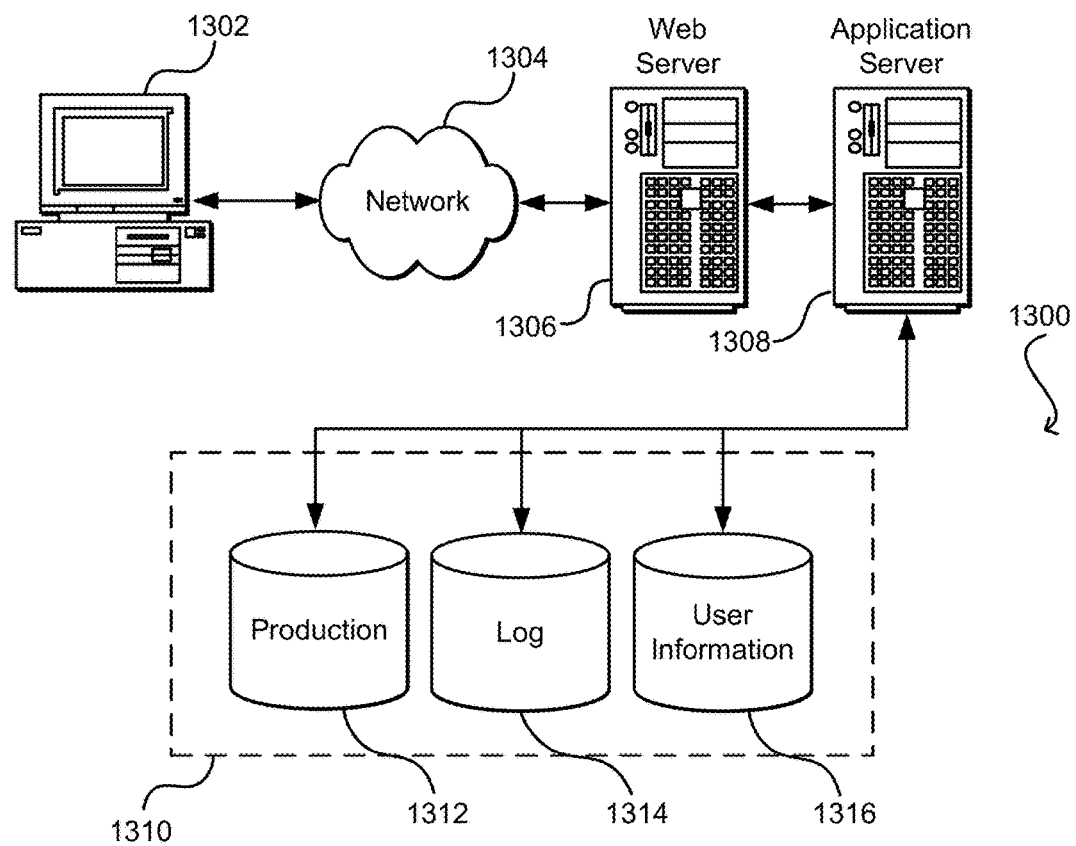
FIG. 10 illustrates aspects of an example environment for implementing aspects in accordance with various embodiments.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit comprising:
   a first memory; and
   a second memory including instructions that, when executed by the integrated circuit, cause the data compression apparatus to:
   receive an uncompressed data stream;
   identify, within the uncompressed data stream, an uncompressible segment of the uncompressed data stream, the uncompressible segment of the uncompressed data stream being a segment of data for which there is no equivalent data segment within the data stream;
   store, in the first memory, a portion of the uncompressible segment, wherein a length of the portion of the uncompressible segment is less than or equal to the size of the first memory, wherein the portion of the uncompressible segment is the entirety of the uncompressible segment if the size of the uncompressible segment of the uncompressed data stream is less than or equal to the size of the first memory;
   generate a sequence that includes the data stored in the first memory and an offset field; and
   populate the offset field, wherein if the size of the uncompressible segment of the uncompressed data stream is less than or equal to the size of the first memory, the offset field is populated with a position from which compressible data should be copied, and wherein if the size of the uncompressible segment of the uncompressed data stream exceeds the size of the first memory, the offset field is populated with a value of zero; and
   store the generated sequence.

2. The integrated circuit of claim 1, wherein the first memory comprises an on-chip memory.

3. The integrated circuit of claim 1, wherein the sequence includes a token, the length of the portion of the uncompressed data stream, the data stored in the first memory, and the offset field.

4. The integrated circuit of claim 1, wherein upon determining that a size of the uncompressible segment of the uncompressed data stream exceeds a size of the first memory, the instructions cause the data compression apparatus to generate multiple sequences from the uncompressible segment of the uncompressed data stream, each of the multiple sequences including a different non-overlapping portion of the uncompressible segment of the uncompressed data stream.

5. The integrated circuit of claim 4, wherein each of the multiple sequences comprise at most one uncompressible segment and at most one offset field, the last of the multiple sequences generated being the only sequence potentially comprising an offset field populated with a non-zero value.

6. An apparatus comprising:
a buffer for temporary storage of data; and
an integrated circuit configured to:
determine that a first portion of a data stream is uncompressible by determining there is no equivalent data segment within the data stream that matches the first portion;
identify a second portion of the data stream comprising a segment of the first portion of the data stream, a size of the second portion of the data stream being less than or equal to the capacity of the buffer, wherein the second portion is equal to the first portion if a size of the first portion of the data stream does not exceed the capacity of the buffer;
load the second portion of the data stream into the buffer;
generate a sequence including the second portion of the data stream in the buffer and an indication as to whether or not there is compressible data, wherein the indication is set to zero when a size of the first portion of the data stream exceeds the capacity of the buffer and wherein the indication is set to a position at which compressible data is located when the size of the first portion of the data stream does not exceed the capacity of the buffer; and
store the generated sequence.

7. The apparatus of claim 6, wherein the indication as to whether or not there is compressible data is stored as an offset value.

8. The apparatus of claim 7, wherein the offset value is set to zero to indicate that there is no compressible data.

9. The apparatus of claim 6, wherein a data compression technique is used to determine that the portion of the data stream is uncompressible.

10. The apparatus of claim 9, wherein the data compression technique comprises a LZ77 based compression scheme.

11. The apparatus of claim 6, wherein the buffer comprises a random access memory (RAM), the capacity of the buffer is based on a capacity of the random access memory, and the size of the portion of the data stream is determined based on a physical limitation related to the capacity of the buffer.

12. The apparatus of claim 6, wherein the integrated circuit is further configured to:
receive the sequence into the buffer;
append the portion of the data stream to a stream of decompressed data; and
provide the stream of decompressed data to a requestor.

13. The apparatus of claim 6, wherein the integrated circuit is a general purpose processor, an application-specific integrated circuit (ASIC) chip, a field-programmable gate array (FPGA), or a graphics processing unit (GPU).

14. The apparatus of claim 6, wherein the indication as to whether or not there is compressible is appended to an end of the generated sequence.

15. A method, comprising:
receiving, at an integrated circuit, a data stream to be compressed;
identifying a block of uncompressible data within a data stream based on determining there is no equivalent data segment within the data stream that matches the uncompressible data;
identifying a portion of the block of uncompressible data having a size less than or equivalent to a predetermined size corresponding to a capacity of a dedicated memory, wherein the portion of the block of uncompressible data is the block of uncompressible data if a size of the block of uncompressible data is less than or equivalent to the predetermined size; and
generating a sequence including the portion of the block of uncompressible data and an indication as to whether or not there is compressible data, wherein the indication is set to zero when a size of the portion of the block of uncompressible data exceeds the predetermined size and wherein the indication is set to a position at which compressible data is located when the size of the portion of the block of uncompressible data does not exceed the predetermined size; and
storing the generated sequence.

16. The method of claim 15, further comprising loading the portion of the block of uncompressible data into the dedicated memory.

17. The method of claim 15, wherein identifying a block of uncompressible data within a data stream comprises using a data compression algorithm.

18. The method of claim 17, wherein the data compression algorithm is a lossless data compression algorithm.

19. The method of claim 17, wherein the data compression algorithm utilizes an explicit dictionary.

20. The method of claim 15, wherein the indication that there is no compressible data is an indication that the size of the block of uncompressible data is equal to the predetermined size.

* * * * *